Aug. 19, 1947.  A. VANG  2,425,767
APPARATUS FOR CONVERTING ELECTRICAL CONDENSER
DISCHARGES INTO MECHANICAL POWER
Filed July 25, 1944
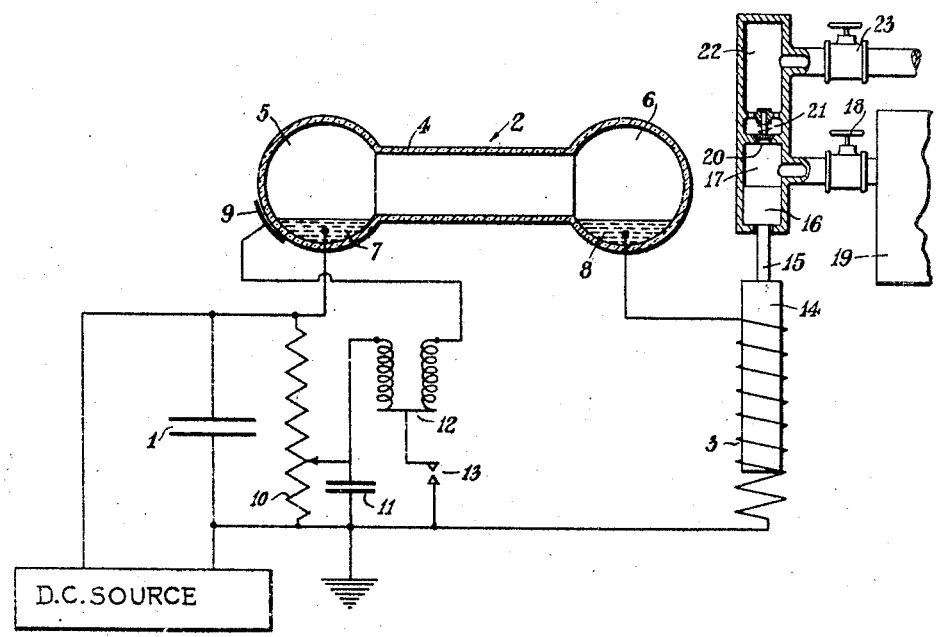
INVENTOR.
ALFRED VANG.
BY Peter M. Boesen
ATTORNEY.

Patented Aug. 19, 1947

2,425,767

UNITED STATES PATENT OFFICE 2,425,767

APPARATUS FOR CONVERTING ELECTRICAL CONDENSER DISCHARGES INTO MECHANICAL POWER

Alfred Vang, New York, N. Y.

Application July 25, 1944, Serial No. 546,542

3 Claims. (Cl. 172—126)

This invention relates to energy translating systems, and more particularly to the conversion of electric energy into intermittent mechanical pulses.

One object of the invention is to provide apparatus for actuation by an electrical power source whence energy may be withdrawn at a predetermined maximum rate, but relatively steadily, and for converting such steadily withdrawn electrical energy into intermittent electrical pulses having a far greater rate of energy flow, whereby peak source loads are greatly reduced.

Another object of this invention is to provide apparatus for storing electrical energy at a predetermined maximum rate and discharging such stored energy at a much greater rate, in the form of discrete pulses, each having a relatively short duration.

Still another object of this invention is to provide a device for converting continuous current into pulses of relatively high momentary energy intensity, and in turn converting such pulses into mechanical pulses having a predetermined and controllable rate of energy discharge of a relatively high magnitude.

Yet another object of this invention is to utilize storage of electric energy in a condenser in lieu of dynamic mechanical energy storage, as in a flywheel.

A still further object of this invention is to provide a device and system able to yield, when energized from an ordinary eelctric source, mechanical pulses of extreme intensity and brevity, and to apply these pulses usefully after conversion into pulsating mechanical energy of the desired characteristics, for example into pressure waves in an elastic fluid.

Applications of the device and system of this invention include vibratory type material feeding or handling devices, hammering, stamping, pressing, forging and riveting devices, metal drawing machines, drilling, tapping, cutting and the like machine tools, compressors, vacuum pumps, flow pumps, diaphragm pumps and hydraulic mechanisms.

A yet further purpose of this invention is to provide a device for converting electrical energy, withdrawn at a substantially uniform rate from a conventional power source, into mechanical energy taking the form of individual reciprocating strokes or pulses, as well as providing simply and easily adjustable means for regulating the number of mechanical pulses occurring in a given unit of time and for regulating the relative amount of energy dissipated in each such mechanical pulse.

Other objects and the manner in which the same are attained, will become apparent as this specification proceeds.

The invention contemplates, broadly, continuously charging a condenser, discharging the condenser as a single pulse, for example, by a suitable switch, converting this electrical pulse into a magnetic pulse, converting the magnetic pulse into a mechanical pulse, and using the mechanical pulse in any desired fashion. Additionally, mechanical storage of this last pulse, as by gas compression, may be employed.

The swtich causing the condenser discharge may be of any type suitable for handling a relatively great amount of power in a relatively short time period. Electronic switches, particularly those employing a metallic vapor, such as mercury, are especially suitable for this purpose. One preferred form of a mercury type switch is disclosed in U. S. Patent 2,287,541, issued to the inventor. Other similar devices are likewise suitable for this purpose.

In the drawing affixed to this specification and forming part thereof, an embodiment of my invention is illustrated diagrammatically by way of example in a single figure; the drawing showing the energy translating, storing and switching system according to the invention, including a circuit diagram for the electric phases thereof.

Referring now to the drawing, the latter shows a conventional D. C. source capable of furnishing energy at a comparatively low maximum rate and a condenser 1 connected with this source, so as to be continuously charged thereby. The condenser 1 is arranged to discharge in a circuit containing the electronic switch indicated at 2, and the solenoid 3.

The electronic switching device 2, may be of the general type disclosed in my U. S. Patents 2,287,540, 2,287,541, 2,287,542, 2,287,543, and 2,287,544, and comprises a dumb-bell shaped envelope 4 filled with mercury vapor, the globular end portions 5 and 6 of which contain mercury pool electrodes 7 and 8, respectively. The electrode 7 is connected directly with one side of the condenser 1, while the electrode 8 is connected with the solenoid 3, which latter in turn is connected with the other side of the condenser.

The electronic switch 2 also includes an igniter electrode 9 which, may be of the external type, in proximity to the mercury pool electrode 7. The firing circuit comprises a resistor 10 connected across the discharge leads from condenser 1, tapped so as to charge, with a desired fraction of the voltage appearing across condenser 1, a smaller condenser 11, which latter is discharged into the primary of a transformer 12, the secondary of which last is connected with the igniter electrode 9. An automatic switch 13, which may be of the mechanical interrupter type, but alternatively may be an electronic tube or any other convenient switching device, determines the discharge of the condenser 11. The firing rate of the igniter electrode 9 is determined by the relative position upon resistor 10 of the tap taken from the upper side of condenser 11. The intensity of the energy present in each pulse will be substantially in inverse ratio to the firing rate. If condenser 11 be connected across only a relatively small portion of resistor 10, then condenser 1 will of necessity reach a relatively high potential before the potential across resistor 10 becomes sufficiently high so that the fractional part of such resistor potential tapped off for condenser 11 is sufficient to charge this condenser to the degree requisite for igniting the main tube 2. On the other hand, if the condenser 11 be tapped off so as to shunt substantially all of resistor 10, then the requisite potential on condenser 11 will be reached as soon as condenser 1 has acquired a similar charge potential. In the former case, the pulses produced will be of relatively low frequency, but each pulse will contain a relatively high peak of energy. In the latter case, condenser 11 will fire tube 2 at more frequent intervals, but with a lower energy peak in each pulse produced by the firing, due to the fact that condenser 1 needs to rise to a charged potential only a fraction of that available from the condenser charging source.

The solenoid 3 has a core 14, a part of the latter forming the piston rod 15 of a piston 16, which is arranged for reciprocating motion inside a compression cylinder 17. This compression cylinder is connected, through a supply valve 18, with a supply 19 of an elastic fluid medium, such as a suitable gas, which preferably is non-corrosive and does not liquify under pressures employed in this system. From the compression cylinder 17, a passage 20 having a non-return valve 21 leads to a second, storage chamber 22 which latter, through a discharge valve 23, is connected with the device to be driven. The supply and discharge valves 18 and 23 are of an automatic type and synchronized to open and close according to requirement as to rate and power of the pulsating energy to be discharged.

The solenoid 3 may be replaced by a transformer, the primary of which may be connected in the discharge circuit, while the secondary then acts as a solenoid, the core thus being located in and influenced by the secondary.

In place of an ordinary, wired type solenoid, the solenoid 3 may have hollow metallic windings, such as copper tubing, which may be liquid cooled to avoid overheating by the extremely high power pulses to which the windings are subjected.

The operation of the energy translating system according to the invention is as follows: The steady current from the D. C. source charges condenser 1. At the same time, potential derived via the variable tap of condenser 11 from the resistor 10 charges condenser 11 which latter, after a time period determined by the relative position of the condenser tap upon resistor 10 and consequent operation of the automatic switch 13, is discharged into the transformer 12, the secondary of which last sends a high voltage pulse through the igniter electrode 9. The resulting sharp pulsation of the electrostatic field within the electronic switch 2 causes such ionization of the mercury vapor contained therein as to initiate conduction through switching tube 2, thus closing the discharge circuit of condenser 1. Various artifices by means of which automatic switch 13 will close when the charge on condenser 11 reaches a predetermined potential are well known in the art and will vary according to the type of switch employed. For example, a mechanical switch of the relay type may be provided with a relatively high resistance winding, the current through which will vary proportionately to the voltage of condenser 11, so that the switch will close only when such current rises to a certain value. If switch 13 be of the two electrode gas discharge type, it will break down when the ionization voltage of the gas, for example neon, is reached. Finally, gas filled tubes employing metallic vapor and provided with a control grid electrode, as well known in the art, may be employed to constitute this switch.

In discharging into the circuit closed by switch 2, the condenser 1 sends a power pulse into the solenoid 3. The relatively great intensity of this power pulse is a consequence of the sudden discharge of the energy accumulated between individual power pulses by condenser 1.

A correspondingly intense impulse is imparted to the core 14, which latter pushes piston 16 into the cylinder 17 to compress the elastic medium supplied through valve 18, the compressed medium filling a storage chamber 22, which last, via valve 23 is tapped at predetermined intervals, to yield pneumatic power pulses of desired value and duration.

The aforementioned cycle of operation terminates as soon as the condenser discharge through tube 2 has dropped below the minimum potential required to sustain conduction through the tube, whereupon a new cycle of operation identical with that described above is initiated.

The invention lends itself to a great variety of industrial applications and results in numerous important advantages.

Vibrating conveyors, shaking conveyors, and any other type of vibratory or reciprocatory material feeding devices may be operated by the sharply peaked power made available from a conventional power source supplying energy at a substantially uniform rate, this device thus lending itself to operating very heavy installations.

Thus the invention may advantageously be applied to a forging press. Many other types of heavy machinery such as hammering, stamping, and pressing machines may utilize this invention. As in all embodiments of the invention, intense yet brief motions of the tool, for example, the forge hammer, are obtained. In the case of forging, as in many other instances, the relatively short, powerful blows result in noteworthy metallurgical advantages. Thus, the grain structure obtained is particularly fine, while the intervals between blows leave more time for a molecular rearrangement, so as to result in a more homogeneous product.

In riveting, the more intense and at the same time far shorter hammer blows are particularly advantageous as they cause the rivets to flow evenly into the holes, thus eliminating the uneven, distorted flow due to directional variations during a slow advance, frequently observed in present practice.

The invention may be used in a drawing mill where the powerful, brief pulls on a wire drawn through dies, for example, afford the metal a chance to flow, not offered by any existing equipment, and resulting in a product of superior homogeneity and uniformity and correspondingly improved metallurgical characteristics, such as yield point, elongation, tensile strength, etc.

This invention is especially suitable for operating a pump, whether of the vacuum, compression, flow or any other type, and whether of reciprocatory, diaphragm or any other design. In a piston pump, for example, the brief, powerful stroke results in the piston passing the packing at such speed as to avoid leakage. Also, the highly peaked power available lends itself especially well to heavy duty hydraulic work, such as the operation of hydraulic lifts, hydraulic presses and the like.

Power is obtainable from the energy storage system described above at any desired rate. Yet, in certain cases it may be desirable to control and vary the highly peaked power pulses imparted to the solenoid core, derived from the high current pulses energizing the solenoid itself. Thus, the entire system may be rendered even more flexible, by incorporating resistances or other current limiting elements in the discharge circuit of condenser 1, whereby the current pulses, and thus the forces imparted to the solenoid core, may be rendered less sharply peaked or less sudden.

I wish it to be understood that I do not desire to be limited to the exact details of construction, design and operation shown and described herein, as various modifications within the scope of the appended claims and having all the advantages of the invention, may readily occur to a person skilled in the art.

Having thus described my invention, what I claim as new and desire to secure by Letters Patent of the United States, is:

1. An energy translating system, comprising means for storing electric power at a relatively low rate, including a condenser, means for changing said condenser at a predetermined rate, means for discharging said condenser intermittently and substantially instantaneously, means for varying the periodicity of the condenser discharge in relation to the rate of condenser charge, and means including a solenoid for converting the relatively rapid electric power pulse thus obtained into a corresponding mechanical high speed pulse, said periodicity varying means including a resistor bridged in its entirety across said condenser, a second and ancillary condenser, means for connecting said ancillary condenser across a selected portion of said resistor, and means connected to said ancillary condenser for causing a discharge of said first condenser when said ancillary condenser has been charged to a predetermined voltage.

2. An energy translating system according to claim 1, in which said condenser discharge means comprises a self-restoring electronic switch provided with a firing circuit, and in which said ancillary condenser actuates said firing circuit when the potential of the charge on said ancillary condenser rises to a predetermined value.

3. An energy translating system, comprising means for storing electric power at a predetermined maximum rate, including a first condenser, means for charging said first condenser at a predetermined rate, trigger tube means for discharging said first condenser intermittently and substantially instantaneously, means for varying the periodicity of the first condenser discharge in relation to the rate of first condenser charge; said last means comprising a resistor connected directly in shunt with said first condenser, a second condenser connected in shunt with a variable portion of said resistor, whereby the time required for said second condenser to acquire a predetermined charge relatively to the time required for said first condenser to acquire full charge may be varied by changing the ratio between said variable portion and the entirety of said resistor, means for periodically discharging said second condenser into the trigger circuit of said tube, whereby to ignite said tube when the charge upon said second condenser has reached a predetermined value, and means for converting the rapid electric power pulse, thus obtained into a correspondingly rapid mechanical pulse.

ALFRED VANG.

REFERENCES CITED

The following references are of record in the file of this patent:

UNITED STATES PATENTS

| Number | Name | Date |
|---|---|---|
| 2,297,025 | Russell | Sept. 29, 1942 |
| 2,147,472 | Ulrey | Feb. 14, 1939 |
| 2,331,058 | Stick | Oct. 5, 1943 |
| 2,354,768 | Nokes | Aug. 1, 1944 |
| 2,018,159 | Walker | Oct. 22, 1935 |
| 2,270,414 | Canetta | Jan. 20, 1942 |

FOREIGN PATENTS

| Number | Country | Date |
|---|---|---|
| 122,421 | Switzerland | 1927 |
| 485,758 | Great Britain | May 24, 1938 |